(No Model.) 3 Sheets—Sheet 1.

C. B. DAVIS.
APPARATUS FOR SEALING CANS.

No. 345,576. Patented July 13, 1886.

Witnesses. Inventor.
Chuyler B. Davis
by E. B. Stocking, Atty.

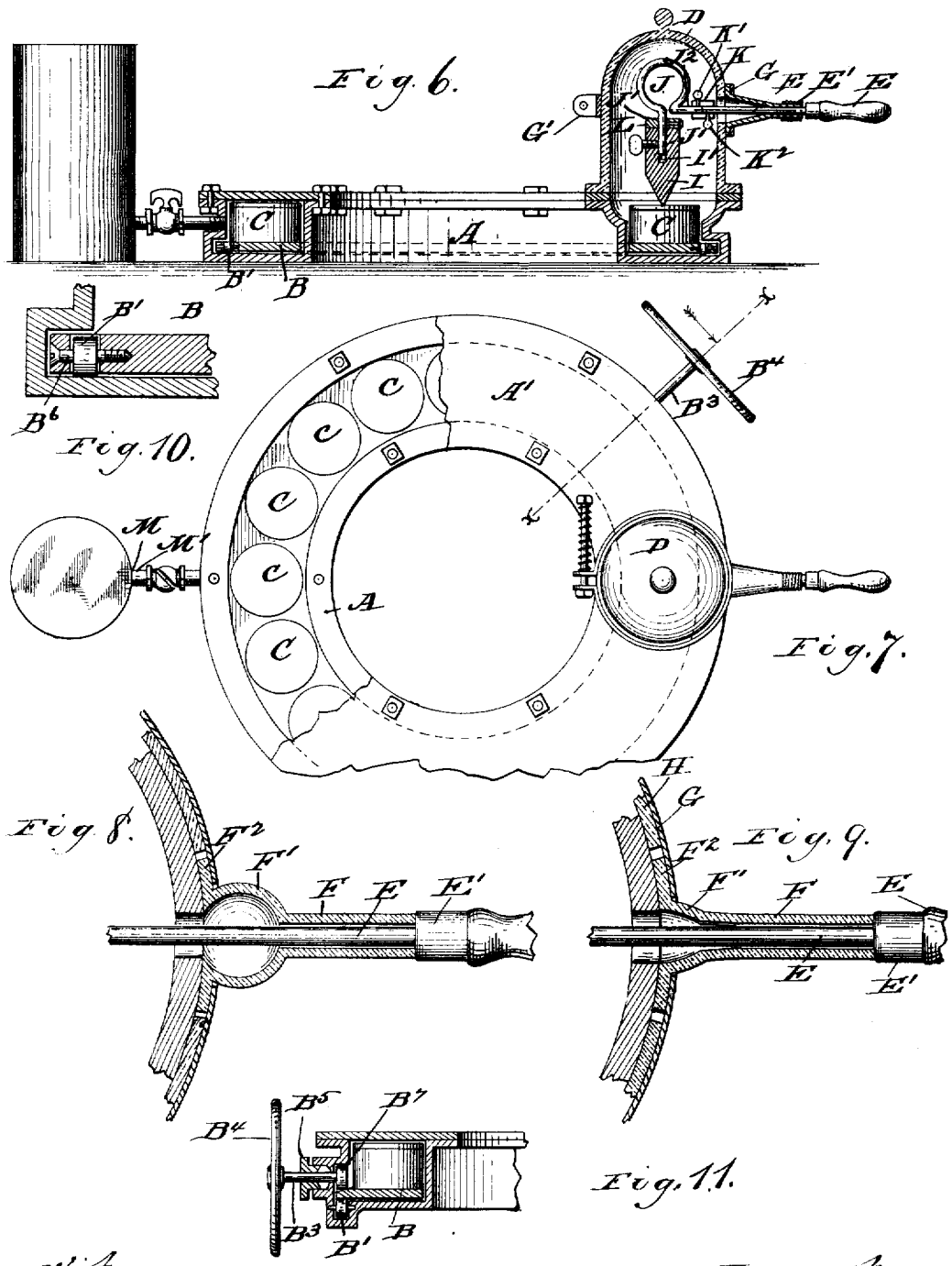

(No Model.) 3 Sheets—Sheet 3.
C. B. DAVIS.
APPARATUS FOR SEALING CANS.

No. 345,576. Patented July 13, 1886.

Witnesses. Inventor.
Sam'l B Dover. Chuyler B. Davis,
Henry Frankfurter. by E. B. Stocking Atty.

UNITED STATES PATENT OFFICE.

CHYLER B. DAVIS, OF CHICAGO, ILLINOIS.

APPARATUS FOR SEALING CANS.

SPECIFICATION forming part of Letters Patent No. 345,576, dated July 13, 1886.

Application filed January 20, 1886. Serial No. 189,166. (No model.)

*To all whom it may concern:*

Be it known that I, CHYLER B. DAVIS, a citizen of the United States, residing at Chicago, in the county of Cook, State of Illinois, have invented certain new and useful Improvements in Apparatus for Hermetically Sealing Cans, of which the following is a specification, reference being had therein to the accompanying drawings.

This invention has relation to a machine for hermetically sealing cans, and the general object in view is to subject a large number of cans to the action of a soldering implement, which, together with the cans, is confined in a machine from which the air is exhausted, and to provide means for manipulating from the outside of the machine, both the soldering implement and the cans within the machine; and the invention consists in certain features of construction hereinafter described, and particularly pointed out in the claims.

Figure 1:
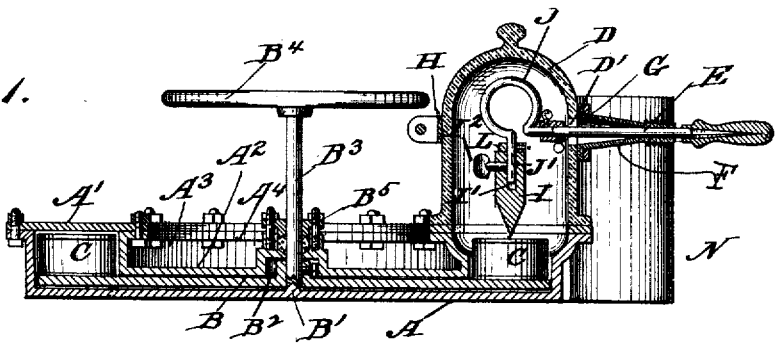
Figure 2:
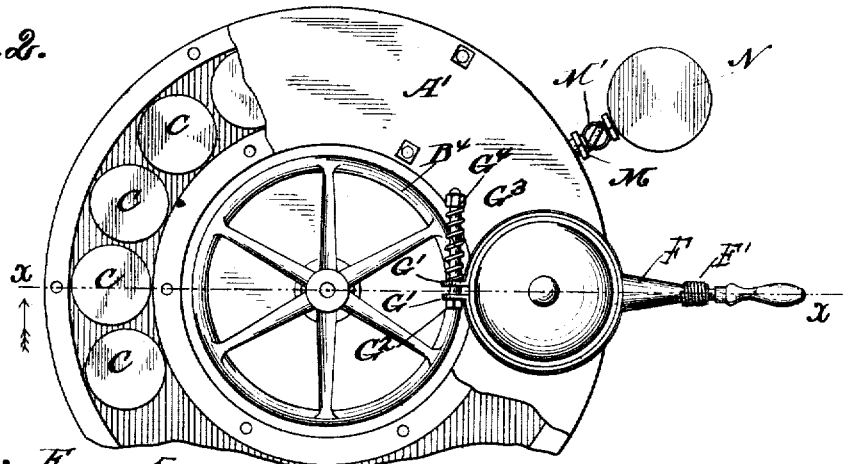
Figure 3:
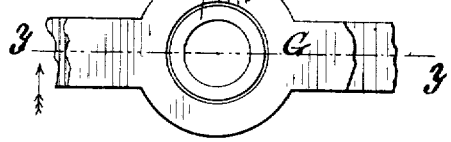
Figure 5:
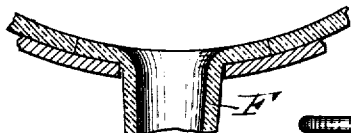
Figure 4:
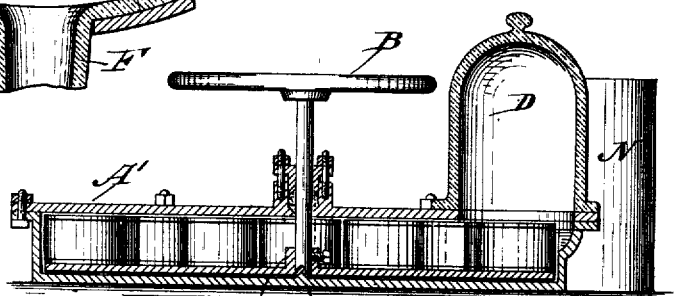
Figure 12:
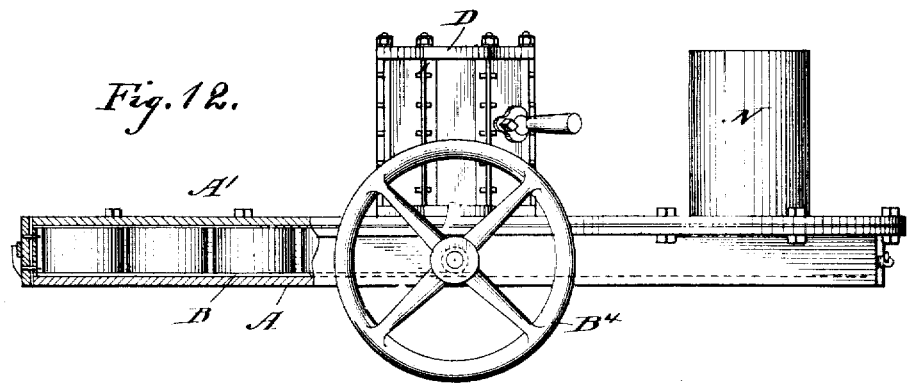
Figure 13:
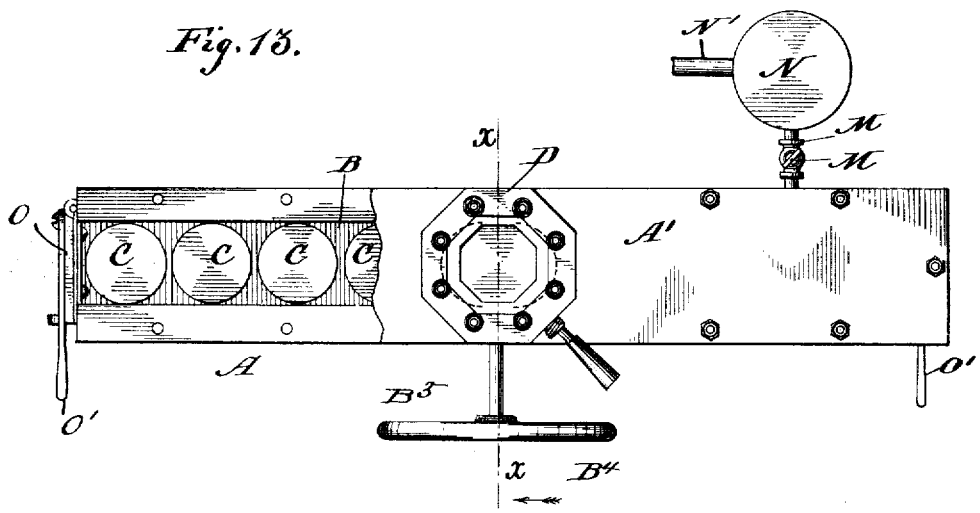
Figure 14:
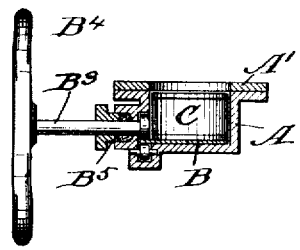
Figure 15:
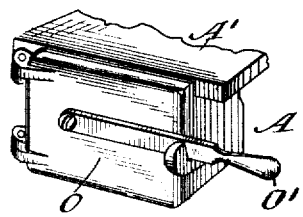

Referring to the drawings, Figure 1 is a central vertical section of a machine embodying my invention. Fig. 2 is a plan with a portion of the top removed, the hand-wheel being shown lower than in Fig. 1. Figs. 3 and 4 are details hereinafter described; and Fig. 5 is a central vertical section illustrating a modification in the construction of the body portion of the machine. Fig. 6 is a vertical section, and Fig. 7, a plan, of a modification of the means employed for presenting successive cans to the soldering implement. Figs. 8 and 9 are modifications of the manner of mounting the soldering implement, and Figs. 10 and 11 are details of the table-operating mechanism. Fig. 12 is a side elevation partly in section, and Fig. 13 a plan, with a portion of the top removed, of a straight machine embodying my invention; and Figs. 14 and 15 are details of the same.

Like letters of reference indicate like parts in all the figures of the drawings.

It is well known in the art of preserving foods that the cans are filled or nearly so, with the article to be preserved, and the cover secured in position upon the body of the can, said covers, however, being provided with a small vent or aperture, through which the air in the can is exhausted, when said aperture is sealed, usually by melting a drop of solder, so as to close the same.

The machine which I have devised is so constructed that a number of cans may be placed therein and consecutively brought into position in proximity to a soldering-tool, which, being properly heated, may be caused to melt a pellet or other form of solder which is placed upon each can, whereby the vent in the can may be closed, the machine also being provided with suitable means for exhausting the air from within the same and from the cans arranged in the machine.

The principal elements of the machine embodying my invention comprise a casing, which constitutes the body of the machine, in which is arranged a table, upon which a number of cans may be placed in a series, means for moving the table with the series of cans thereon, so as to bring each can to the soldering implement and to conduct each of the cans from the soldering implement, a chamber, in which the soldering implement is suspended, so arranged as to communicate with the portion of the body of the machine in which the cans are arranged, and a device connected with the body of the machine and adapted to produce a vacuum or partial vacuum therein, the connections of one within the several other parts being such that the external atmosphere shall not have access to the interior of the machine, and yet permit the necessary movement of the entire mechanism, to accomplish the work in view.

Referring to the drawings, A represents the case or body of the machine, which may be either circular or straight in general outline, and which is provided with a cover, A', secured by bolts or otherwise to the body. This cover may extend completely across the body, as shown in Figs. 5, 12, and 13, or, as shown in Figs. 1, 2, 6, and 7, may extend only over that portion of the body in which the cans are arranged. In this latter form of cover a casting, A², substantially circular in contour, and having an upright wall, A³, terminating in a horizontal flange, A⁴, is employed to complete the body portion of the machine. (See Fig. 1.)

Within the body of the machine is arranged a table, B, which, in machines that are circular in contour, may be mounted upon a pivot or center, B', formed on the bottom of the case, the table being provided with a central hub, B², in which is secured a shaft, B³, having a hand-wheel, B⁴, by which the table may be revolved from the outside of the body of the machine. The shaft B³ passes through a stuffing-box, B⁵, arranged upon that part of the cover or top of the machine through which the shaft passes.

Instead of the mechanism just described for supporting and rotating the table, I may provide anti-friction rollers B', (see Figs. 6, 10, and 11,) mounted either in slots formed near the edge of the table and upon screws or bolts B⁶, crossing said slots; or I may form slots or an annular groove in the bottom of the case (see Fig. 11) and mount the anti-friction rollers B' therein, and in either arrangement of said anti-friction rollers I may arrange the shaft B³ horizontally, and provide it with the hand-wheel B⁴, and with a friction disk or roller, B⁷, arranged to bear upon the upper surface of the table B, so that by rotating the hand-wheel B⁴ the table B may be rotated so as to bring any one of a series of cans, C, to a desired point or position within the machine. In either arrangement of the shaft and hand-wheel a stuffing-box, B⁵, or an equivalent construction is necessary, to prevent ingress of air at the time the air is exhausted from the interior of the machine. It is of course understood that in case the body of the machine is straight the table B is substantially one-half the length of the case, in order that it may be moved from one end to the other thereof by means of the hand-wheel B.

In both constructions, as thus far described, the table is adapted to receive and present for soldering a row of cans, the operation of the parts being such that after a can is soldered another succeeding can is presented for the same operation.

Communicating with the portion of the body of the machine through which the cans are moved is a soldering-chamber, D, which, in this instance, is constructed of glass, and is mounted upon the case in a manner to prevent access of external air at the joint between the chamber and the case. An aperture, D', is formed in the soldering-chamber D, through which the handle E of the soldering-tool passes. A rubber tube, F, is at one end secured in position, so as to communicate with and cover the aperture D' by means of a band, G, which passes around the chamber D, and is bent to form ears G', through which passes a bolt, G², encircled by a coiled spring, G³, abutting against one of the ears G' and against the nut G⁴. The band G is provided with an apertured enlargement, G⁵, adapted to permit the passage therethrough of the rubber tube F, which may, if desired, be provided with a spherical or other enlargement, F', and an annular flange, F², adapted to rest against the outer surface of the soldering-chamber. The opposite end of the rubber tube F is secured by a cord, ferrule E', or other suitable means, in an air-tight manner, to the handle E of the soldering implement. A rubber band, H, may also be inserted between the band G and the wall of the soldering-chamber, to serve as a cushion or packing, to permit of expansion and contraction of said chamber, caused by the heat of the soldering-iron, without breaking the same by reason of the contact or compression of the metal band G thereon.

By the construction thus far described, with regard to the mounting of the soldering-tool, it will be seen that the coiled spring G³ and bolt G², and that the ears G' of the band may be separated from each other, so as to permit of a complete removal of the band from the chamber, so that the handle of the soldering implement may be disconnected therefrom.

I represents the soldering tool or copper proper. In this instance it is centrally bored, as at I', for the reception of a section of the handle, a thumb-screw, I², serving to removably secure the copper to the handle-section.

J represents what I have designated as a section of the handle of the soldering implement; and it consists in a rod bent to form a ring, or, it may be a succession of rings or coils J, one terminal, J', of which is inserted into the bore I' of the copper, and the other terminal, J², of which into a coupling, K, having thumb-screws K' K², by which said coupling is removably secured to the handle E proper, and to the section terminal J². A collar, L, is also mounted upon the terminal J', adjustably, in order to serve as a gage for determining the extent to which the terminal J' shall be inserted into the copper.

Certain features of construction with regard to the soldering tool and chamber herein shown and described are also shown and described in a companion application, No. 145,685, filed by me October 16, 1884, and are not therefore herein claimed.

By the provision of the coil or coils or other form of extension of the handle of the soldering implement, I prevent in a marked degree the conduction of heat from the soldering-copper proper to the handle proper of the soldering implement, and to the walls of the soldering-chamber. Furthermore, in substituting one copper for another, I may also substitute one section for another, so that when one section becomes heated a cool one may take its place, and thus the convection of heat to the soldering-chamber may be greatly reduced, if not entirely overcome.

It is apparent that the object of employing a glass soldering-chamber is to permit of a clear inspection of the work being performed within, so that the soldering-tool may be accurately directed to the vent on each can as it is brought beneath the soldering-chamber for the closure of its vent.

In Figs. 12 and 13 I have indicated a construction of a soldering-chamber differing from that shown in the remaining figures; but I do not herein claim any of said features of construction, as they are more particularly illustrated and described in a companion application filed herewith.

Communicating with the body of the machine is a pipe, M, having a stop-cock or valve M', which pipe also communicates with a chamber, N, from which, by any suitable means, the air is exhausted, the connection with the exhaust-pump or other device being by means of a pipe, N'.

In cases where I construct machines which are straight, I provide at each end thereof a door, O, having a latch, O', by which the same may be closed hermetically. Said door communicates with the portion of the body of the machine in which are arranged the cans upon the table B therein. In the other forms of machines shown the whole or a portion of the cover A' may be removed, or any suitable door may be provided to give access to the interior, for the purpose of placing cans therein.

Having described the construction of my machine in its different forms, the operation is as follows: A number of cans, sufficient in the instance of a circular machine to fill the annular portion provided for the reception and passage of the cans, are placed therein, and in case of a straight machine such number of cans would be limited only by the capacity of one-half the entire length of the body of the machine, the soldering-chamber D being arranged substantially at the middle of the machine. When the cans are placed upon the table B, the door or cover is closed in such a manner as to prevent access of the external atmosphere into the body of the machine, when the next step of the operation is performed, which is to exhaust the air from the body of the machine, each can, however, having been previously provided with a pellet, drop, or other form of solder placed upon the cover thereof and over or near the vent therein. In order to exhaust the air from the machine, the valve M' is opened, when the air passes into the vessel N. The valve M' is again closed, and by rotating the hand-wheel B⁴ each can is successively brought beneath the soldering-chamber and under the soldering implement therein, the copper I of which has been previously heated, when, by elevating the exterior end of the handle E, the copper is depressed and brought into contact with the solder, which is melted, and a succeeding can in the row or series is then brought to position and soldered in a like manner. When all of the cans have been soldered, they are removed, and another set or series are subjected to the same operation.

Instead of providing a door in the top A' in the forms of the machines shown in Figs. 1, 2, and 5, the cans may be placed upon the table when the soldering-chamber is removed, and through the opening communicating from the can-receiving portion of the machine with the soldering-chamber.

It is apparent that by providing a separate though communicating soldering-chamber less air is required to be exhausted from the apparatus than when the can receiving and soldering chambers are merged into one high chamber, as heretofore constructed.

The flexible connections for the soldering copper and chamber are not broadly claimed herein, as they form the subjects-matter of claims in my application No. 145,685, above mentioned, and in another application, No. 189,167.

Having thus fully described my invention and its operation, what I claim is—

1. A machine for hermetically sealing cans, comprising a case having an annular can-receiving chamber, a separate communicating soldering-chamber provided with a soldering implement, and a can-table adapted for movement along and within said annular can-receiving chamber, substantially as specified.

2. The combination, with a glass soldering-chamber, D, of a soldering implement comprising a main handle-section flexibly mounted upon and passing through a wall of the chamber, a removable copper, and a removable handle-section, substantially as specified.

3. The combination, with the chamber D, of the metal band G, the bolt G², nut G⁴, flexible tube F, and spring G³, substantially as specified.

4. The combination, with the soldering-chamber D, formed of glass, of a flexible flanged tube, F, the band G, and the rubber packing or cushion H, substantially as specified.

5. The combination of the soldering-chamber D, formed of glass, the band G, the bolt G², nut G⁴, coiled spring G³, rubber tube F, and a soldering-tool handle secured within the tube F, and passing through the wall of the chamber, substantially as specified.

6. The combination of the body or case A, the table B, the anti-friction rollers B', the shaft B², and the friction-disk B⁵, substantially as specified.

In testimony whereof I affix my signature in presence of two witnesses.

CHYLER B. DAVIS.

Witnesses:
 CARL R. SHERWOOD,
 HENRY BOOTH.